US012166681B2

United States Patent
Chanda et al.

(10) Patent No.: US 12,166,681 B2
(45) Date of Patent: *Dec. 10, 2024

(54) ENHANCED MANAGEMENT OF COMMUNICATION RULES OVER MULTIPLE COMPUTING NETWORKS

(71) Applicant: VMware LLC, Palo Alto, CA (US)

(72) Inventors: Arijit Chanda, San Jose, CA (US); Rajiv Krishnamurthy, San Jose, CA (US)

(73) Assignee: Nicira, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/170,917

(22) Filed: Feb. 17, 2023

(65) Prior Publication Data

US 2023/0208765 A1 Jun. 29, 2023

Related U.S. Application Data

(63) Continuation of application No. 15/820,075, filed on Nov. 21, 2017, now Pat. No. 11,588,739.

(51) Int. Cl.
*H04L 47/20* (2022.01)
*H04L 49/00* (2022.01)
*H04L 49/35* (2022.01)

(52) U.S. Cl.
CPC ............ *H04L 47/20* (2013.01); *H04L 49/309* (2013.01); *H04L 49/35* (2013.01); *H04L 49/355* (2013.01); *H04L 49/70* (2013.01)

(58) Field of Classification Search
CPC ....... H04L 47/20; H04L 49/309; H04L 49/35; H04L 49/355; H04L 49/70
See application file for complete search history.

(56) References Cited

U.S. PATENT DOCUMENTS

| | | |
|---|---|---|
| 2007/0127382 A1* | 6/2007 | Hussain .................. H04L 49/70 370/235 |
| 2012/0263159 A1 | 10/2012 | Moeller et al. |
| 2012/0303695 A1 | 11/2012 | Michel et al. |
| 2014/0241348 A1 | 8/2014 | Yadav et al. |
| 2015/0032367 A1 | 1/2015 | Stenneth |
| 2016/0132805 A1 | 5/2016 | Delacourt et al. |
| 2016/0164907 A1 | 6/2016 | Satish et al. |
| 2017/0201629 A1* | 7/2017 | Li ........................ H04L 41/0893 |
| 2017/0250869 A1* | 8/2017 | Voellmy ................. H04L 43/14 |
| 2018/0198718 A1 | 7/2018 | Turner et al. |

\* cited by examiner

*Primary Examiner* — Walter J Divito
(74) *Attorney, Agent, or Firm* — Quarles & Brady LLP (57) ABSTRACT

Described herein are systems, methods, and software to enhance the implementation of communication rules in a computing network. In one example, a method of operating a communication settings system maintains communication rules for a plurality of networks, wherein the communication rules define forwarding actions for ingress and egress packets to and from applications in the plurality of computing networks. The service further identifies a configuration request from a computing network with applications executing in the computing network, identifies a subset of the communication rules based on the plurality of applications, and provides the subset of the communication rules to the computing network.

20 Claims, 7 Drawing Sheets

| COMM RULES 410 | SOURCES 412 | DESTINATIONS 414 | ACTIONS 418 |
|---|---|---|---|
| RULE A 440 | SOURCE | DESTINATION | ACTION |
| RULE B 441 | SOURCE | DESTINATION | ACTION |
| RULE C 442 | SOURCE | DESTINATION | ACTION |
| RULE D 443 | SOURCE | DESTINATION | ACTION |

DATA STRUCTURE 400

FIGURE 4

| APPLICATIONS 510 | APPLICATION VERSIONS 512 | LICENSES 514 | COMPLIANCES 516 |
|---|---|---|---|
| APPLICATION 520 | VERSION 530 | LICENSE 540 | COMPLIANCE 550 |
| APPLICATION 521 | VERSION 531 | LICENSE 541 | COMPLIANCE 551 |
| APPLICATION 522 | VERSION 532 | LICENSE 542 | COMPLIANCE 552 |
| APPLICATION 523 | VERSION 533 | LICENSE 543 | COMPLIANCE 553 |

DATA STRUCTURE 500

ENHANCED MANAGEMENT OF COMMUNICATION RULES OVER MULTIPLE COMPUTING NETWORKS

RELATED APPLICATIONS

This application hereby claims the benefit of and priority to U.S. patent application Ser. No. 15/820,075, titled "ENHANCED MANAGEMENT OF COMMUNICATION RULES OVER MULTIPLE COMPUTING NETWORKS," filed Nov. 21, 2017, and which is hereby incorporated by reference in its entirety.

TECHNICAL BACKGROUND

In computing environments, software defined networks may be used that comprise software modules capable of providing a communication platform for one or more virtual nodes in the computing environment. The software defined networks, which may include logical switches, routers, distributed firewalls, and the like, may be used to intelligently direct communication on the network by inspecting packets before passing them to other computing nodes. For example, packets may be inspected to determine the source and destination internet protocol (IP) addresses to determine if the communication is permitted to be delivered to the destination computing node. In some implementations, software defined networks may be designed with packet forwarding configurations that indicate actions to be taken against each communicated packet. The packet forwarding configurations may identify specific attributes, such as IP addresses, media access control (MAC) addresses, and the like, within the data packet and, when identified, provide a set of actions to be asserted against the data packet. These actions may include modifications to the data packet, and forwarding rules for the data packet, amongst other possible operations.

To manage the software defined networks, a management system or controller may provide a control plane separate from the data plane of the networks. These management systems are used to define forwarding behavior by managed forwarding elements, such as virtual switches, that direct packets for logical overlay networks, also referred to as a software defined networks. In some implementations, this management system may define which nodes are associated with which networks, which security mechanisms are placed on communicating packets, or some other control mechanism (e.g., load balancing, access control lists, etc.) with respect to the software defined networks. An example implementation is described in U.S. Pat. No. 9,015,823 to Koponen et al., which is inporporated herein by reference.

In some implementations, when a computing network is deployed, an administrator associated with the network may have difficulty in determining how to configure the software defined network. In particular, based on the applications and services deployed within the virtual nodes, it may be difficult and cumbersome to determine which internal communications within the network should be permitted, and which external communications with computing nodes outside of the network should be permitted.

SUMMARY

The technology described herein enhances the management of communication rules over multiple computing networks. In one implementation, a method of managing communication rules for a computing network comprises maintaining communication rules for a plurality of computing networks, wherein the communication rules define forwarding actions for ingress and egress packets to and from applications in the plurality of computing networks. The method further provides receiving a configuration request from a computing network, wherein the configuration request indicates a plurality of applications executing in the computing network. Once received, the method includes identifying a subset of the communication rules based on the plurality of applications, and providing the subset of the communication rules to the requesting computing network.

DETAILED DESCRIPTION

Figure 1:
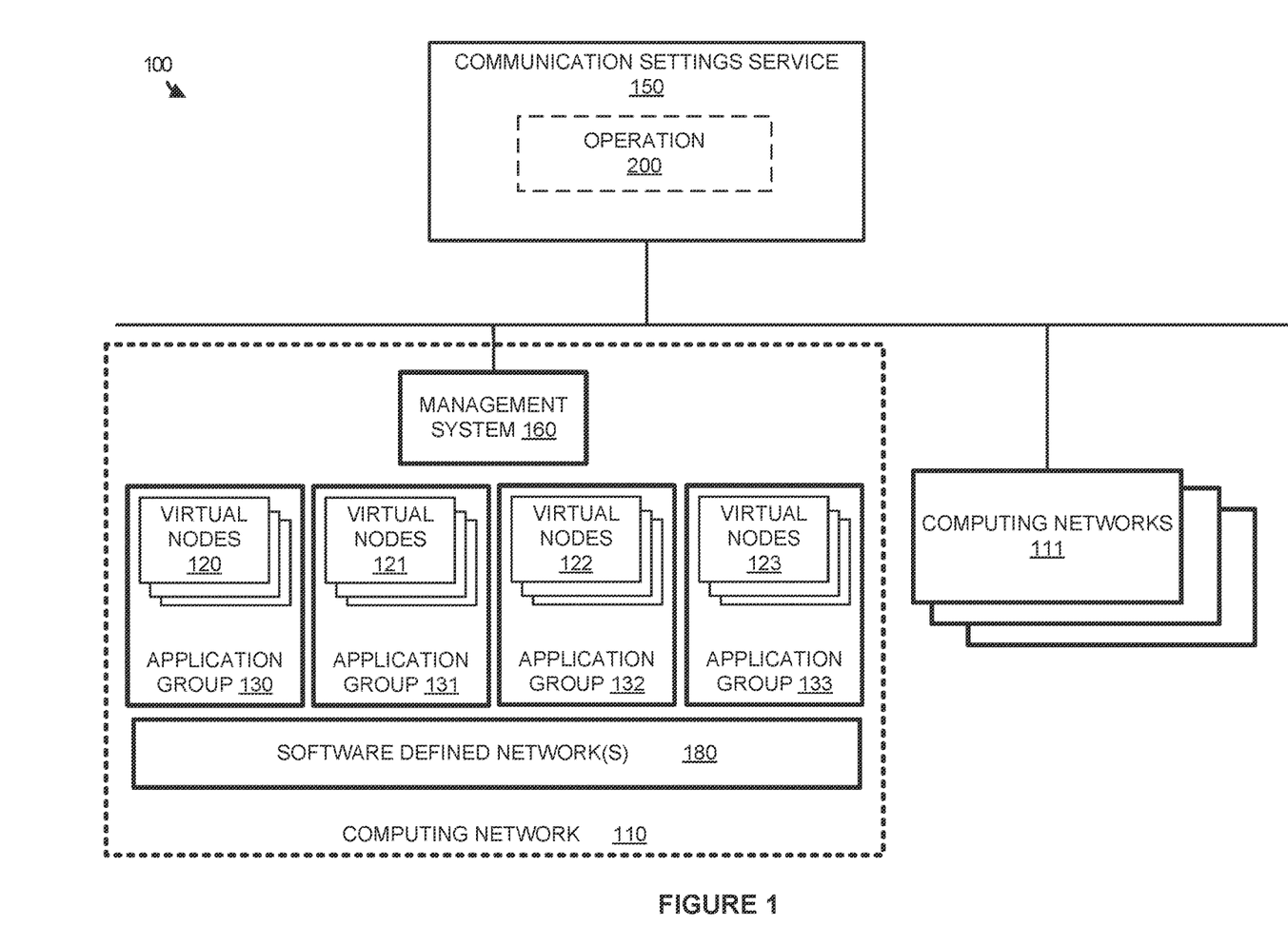
FIG. 1 illustrates a computing environment to provide suggested communication rules according to an implementation.

FIG. 1 illustrates a computing environment 100 to provide suggested communication rules according to an implementation. Computing environment 100 includes computing networks 110-111 and communication settings service 150. Computing network 110 further includes management system 160, software defined network(s) 180, and application groups 130-133 with corresponding virtual nodes 120-123. Communication settings service 150 is further configured to provide operation 200, which is described in additional detail in FIG. 2.

In operation, computing networks 110-111 include one or more physical computing systems that provide a platform for virtual nodes, such as virtual nodes 120-123 in computing network 110. These virtual nodes may comprise full operating system virtual machines and/or containers, wherein the containers may comprise Linux containers, Docker containers, and other similar namespace based containers. Rather than requiring a separate operating system, which is required for virtual machines, containers may share resources from the host computing system, wherein the resources may include kernel resources from the host operating system, and may further include repositories and other approved resources that can be shared with other containers or processes executing on the host. However, although resources may be shared between the containers on a host, the containers are provisioned to have private access to the operating system with their own identifier space, file system structure, and network interfaces. The operating system may also be responsible for allocating processing resources, memory resources, network resources, and other similar resources to the containerized endpoint.

As part of the virtual nodes, each of the virtual nodes may be configured to provide one or more operations. The operations may include front-end management operations, data processing operations, web browsing operations, multimedia editing operations, productivity operations, or some other similar operation. In providing the required operation, each of the virtual nodes may be configured such that the applications executing thereon may only communicate with other defined nodes, computing systems, and services. In particular, in providing the communications for the virtual nodes, software defined network(s) 180 executing on the physical computing systems that support the virtual nodes may be used to intelligently direct communications by inspecting packets before passing them to other computing nodes (virtual or physical). For example, packets may be inspected to determine the source and destination internet protocol (IP) addresses to determine if the communication is permitted to be delivered to the destination computing node. In some implementations, software defined networks may be designed with packet forwarding configurations that indicate actions to be taken against each communicated packet. The packet forwarding configurations may identify specific attributes, such as IP addresses, media access control (MAC) addresses, and the like, within the data packet and, when identified, provide a set of actions to be asserted against the data packet. These actions may include modifications to the data packet, and forwarding rules for the data packet, amongst other possible operations.

In the present implementation, the virtual nodes are classified into application groups 130-133 based on the applications that are executing thereon. From that application groups, communication rules are generated that define which computing nodes each of the groups is permitted to communicate with. For example, application group 130 may be permitted to communicate with application group 131, but may be prevented from communicating with any other computing nodes. In contrast, application group 133 and the associated nodes may be permitted to communicate with any computing system, and may not be limited to communications from a specific application group. In defining the rules for the application groups, communication settings service 150 is used, wherein communication rules from other computing networks may be used in providing suggested communication rules to management system 160 for deployment in computing network 110.

Figure 2:
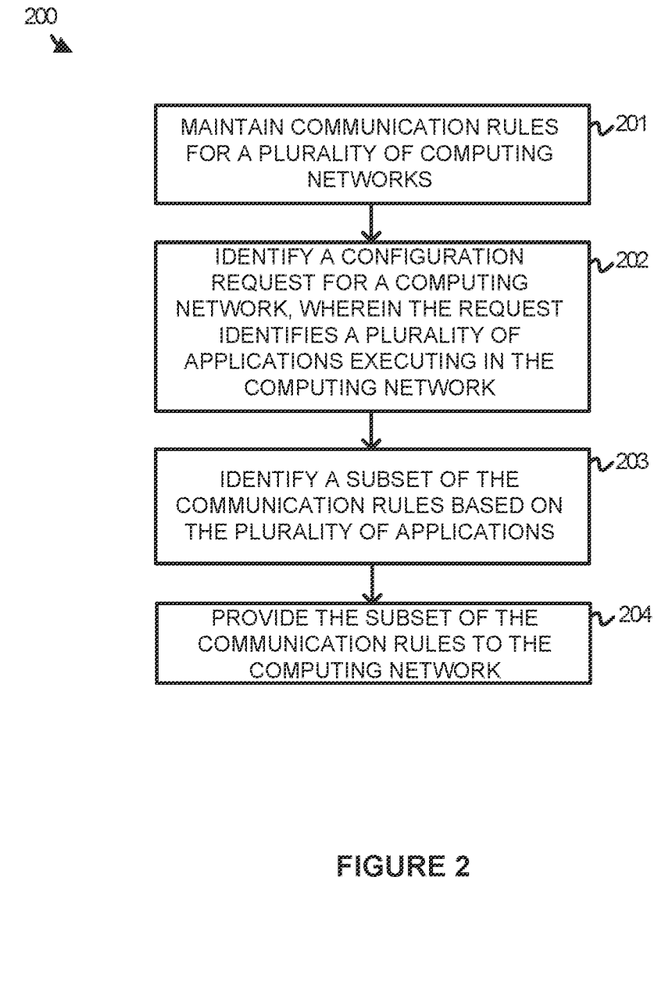
FIG. 2 illustrates an operation of a communication settings service according to an implementation.

FIG. 2 illustrates an operation 200 of a communication settings service according to an implementation. The processes of operation 200 are referenced parenthetically in the paragraphs that follow with reference to systems and elements of computing environment 100 of FIG. 1.

As depicted in FIG. 2, operation 200 of includes maintaining (201) communication rules for a plurality of computing networks. These communication rules each define at least a source, a destination, and an action. The source may correspond to an application (executing on one or more virtual nodes of the computing network) or some element or elements executing outside of the computing network. Similarly, the destination may correspond to an application (executing on one or more virtual nodes of the computing network) or some computing element or elements executing outside of the computing network. Additionally, the action may comprise an action to permit the forwarding of an identified data packet, block the forwarding of the identified data packet, reroute the communication to an alternative destination, or some other similar operation. For example, a communication rule may define that nodes associated with a first application, such as a front-end application, may communicate packets with nodes associated with a second application, such as a database application. As another example, a rule may define that nodes associated with a first application may not communicate with any computing system outside of the computing network (e.g. outside of computing network 110).

In some implementations, in maintaining the rules, communication settings service 150, which may comprise a cloud service hosted in one or more remote computing systems from computing networks 110-111, may request and receive the communication rules from management systems located in each of computing networks 111. In other implementations, rather than requesting the communication rules from the computing networks, the computing networks may provide the implemented communication rules at intervals to communication settings service 150. These intervals may be periodic, may be provided as the rules are implemented, or may be provided at any other similar interval. In some examples, in addition to providing the rules that were implemented within the computing network, the management system for the computing networks may also provide information about the topology of the network. This topology information may include information about all of the applications executing within the environment (e.g. the names, the version numbers, any license or compliance information, and the like). This information may then be maintained at communications settings service 150 to assist in providing suggested communication rules to other computing networks.

In some implementations, to identify the information about applications executing in the various networks, administrators may deploy monitoring and/or introspection services within the network to identify information about the various applications executing therein. This information may include information about the applications (names, version numbers, licensing information, and the like), and may further include information about the packets exchanged between the virtual nodes, such as source and destination addressing information for the packets, transmission control protocol (TCP) information, or any other similar information for packets exchanged by the applications on the virtual nodes. Once the information is collected, the information may be provided to communication settings service 150 to be used in providing suggested rules to other computing networks.

As the information is maintained at communication settings service 150, operation 200 further includes identifying (202) a configuration request for a computing network, wherein the request identifies a plurality of applications executing in the computing network. For example, when computing network 110 is configured, management system 160 may generate a request to communication settings service 150 to identify suggested communication rules for the applications executing therein. In the request, management system 160 may provide information about the applications that will operate in computing network 110, represented in computing environment 100 as application groups 130-133. This information about the applications may include the name of the application, the version of the application, licensing information for the application, compliance information for the application (e.g. such as health care regulation compliance, financial regulation compliance, and the like), communication traits of the application in the network, or any other similar information about the application, including combinations thereof. The application information may be provided by an administrator of the computing network, or may be identified by a process that monitors the applications executing within the computing network.

Once the information is provided for the applications, operation 200 identifies (203) a subset of the maintained communication rules based on the plurality of applications provided from the requesting computing network. In some implementations, in identifying the subset of communication rules, operation 200 may determine similarities between the requesting computing network and other computing networks that have provided communication rules to communication settings service 150. Referring to the example of computing environment 100, communication settings service 150 may identify one or more computing networks in computing networks 111 that includes application groups similar to that of computing network 110. Once a computing network is identified with similar application groups, communication settings service 150 may identify communication rules associated with the similar computing network. For example, if a computing network in computing networks 111 included application groups similar to application groups 130-133, then the communication rules from the identified computing network may be identified for computing network 110.

In some examples, in identifying similar computing networks, communication settings service 150 may identify networks that meet matching criteria for the requesting computing network. In determining whether a computing network meets the matching criteria for the requesting computing network, the communication settings service may compare similarities in the types of applications between the computing networks, the quantity of similar applications in the computing network, a size comparison between the networks (e.g. the number of virtual nodes in the network), compliance similarities between applications in the networks, or some other similarity information, including combinations thereof. Once a network is identified, communication rules for the similar network may be identified for the new computing network. As an example, if a computing network in computing networks 111 included applications that correspond to application groups 130-132, then communication rules may be identified from the computing network for computing network 110. These identified communication rules may comprise any communication rules from the computing network that correspond to the similar applications. Although described in the previous example as identifying rules from a single computing network, it should be understood that communication settings service 150 may identify communication rules from multiple computing networks. Thus, if one computing network provided rules for application groups 130-131, a second computing group may be used to provide rules for applications groups 132-133.

Once the communication rules are identified, operation 200 provides (204) the subset of the communication rules to the requesting computing network. In some implementations, in providing the subset of the communication rules to the computing network, the rules may be provided such that an administrator of the computing network may s elect or approve at least a portion of the communication rules to be implemented within the computing network. For example, communication settings service 150 may provide a subset of communication rules to management system 160. In response to receiving the subset of communication rules, the communication rules may be presented to an administrator associated with computing network 110. From the subset of rules, the administrator may select one or more of the rules, modify one or more of the rules, or provide any other similar action with the rules to deploy the rules in software defined network(s) 180 for virtual nodes 120-123. This deploying may include translating the rules into flow tables or data structures for the virtual switches providing connectivity to virtual nodes 120-123. For example, if a communication rule provided that application group 130 is permitted to communicate with application group 131, then the rules may be translated into a forwarding (sometimes referred to as a flow) data structure, wherein source and destination IP addresses, source and destination MAC addresses, and/or any other similar identifiable attribute of ingress and egress packets for virtual nodes 120-121 may be used in forwarding the packets as the rules require.

In another implementation of providing the rules to computing network 110, communication settings service 150 may initiate implementation of the rules within computing network 110. This may include providing management system 160 for the rules to be deployed to virtual switches for virtual nodes 120-123, wherein the rules may be translated into forwarding data structures at the virtual switches to forward packets based on their source and destination IP address, source and destination MAC address, and/or any other similar attribute in the packet to forward the packet as the rule requires. Further, once the rules are implemented via the suggestions from communication settings service 150, the administrator at management system 160 may have the opportunity to add, remove, and/or modify the implemented rules. In this manner, communication settings service 150 may be responsible for providing a default configuration, while an administrator may modify the configuration using management system 160.

Once a configuration is implemented and approved via an administrator of computing network 110, information about the configuration may be provided back to communication settings service 150. This information may include information about the communication rules that were implemented, wherein the communication rules may be used in providing rules to other computing networks when a configuration request is generated. For example, if computing network 110 generated a new communication rule, then that rule may be provided to communication settings service 150 and subsequently provided to other requesting computing networks in computing networks 111. In some implementations, when the rules are generated and provided to communication settings service 150, the communications may be encrypted to maintain security as the rules are communicated between the computing networks and the communication settings service.

In some implementations, in determining which computing networks should be used for the suggestions for a computing network, communication settings service 150 may rely on a variety of factors. In some examples, an administrator of a computing network may define which other computing networks should be used in providing communication rules to the current network. For example, an organization may specify that rules should only be provided from networks of other trusted organizations. In other implementations, administrators of the computing networks may provide feedback regarding each of the computing networks, wherein the feedback may identify an approval rating of rules from the network, a quantity of other networks that implement the same rules, or some other similar feedback information. It should be understood that some combination of the factors provided above may be used in defining which computing networks are used in providing suggested rules to a requesting computing system.

Figure 3:
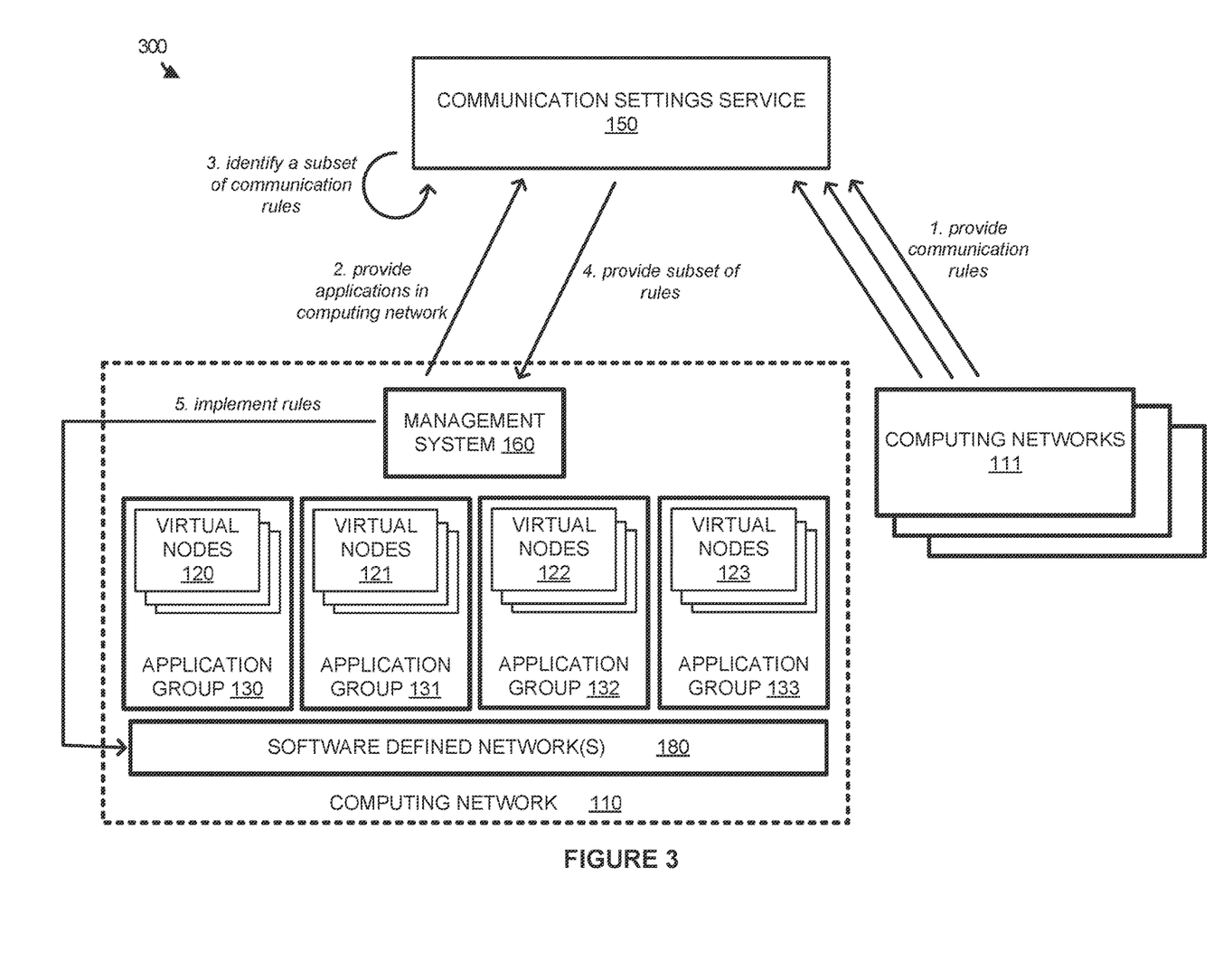
FIG. 3 illustrates an operational scenario of providing suggested communication rules for a computing network according to an implementation.

FIG. 3 illustrates an operational scenario 300 of providing suggested communication rules for a computing network according to an implementation. Operational scenario 300 includes systems and elements of computing environment 100 of FIG. 1.

In operation, communication settings service 150 maintains information about communication rules that are implemented at a plurality of communication rules. In maintaining this information, computing networks 111 provide, at step 1, the communication rules, wherein each of the communication rules defines a source, a destination, and an action to be taken on the packet that meets that source and destination requirements. In the present implementation, each of the communication rules defines an application as at least one of the source or destination, wherein the application corresponds to one or more virtual nodes within the computing network executing the application. As an example, a rule may provide that virtual nodes that execute a front-end application may be capable of communicating with virtual nodes that provide a database application.

As the various communication rules are identified from the computing networks, a new computing network (computing network 110 in the present example) may provide, at step 2, identifiers for applications that are executing within the computing network as part of a network configuration request. This identifier information for each of the applications may include a name of the application, a version, any licensing or compliance information, or any other similar identifier information for the application. Based on the information, communication settings service 150 identifies, at step 3, a subset of the communication rules to be provided to the computing network 110 and management system 160, and, once identified provides the subset of the communication rules to management system 160 at step 4. After providing the rules, management system 160 may be responsible for implementing the rules as part of software defined network(s) 180 at step 5.

In some implementations, in identifying the subset of the communication rules for a computing network, communication settings service 150 may identify rules that meet criteria for the new computing network. In some examples, communication settings service 150 may identify computing networks with configurations similar to that of computing network 110. To identify the similar networks, communication settings service 150 may consider similarities in the types of applications, the quantity of similar applications, the size of the network, or any other similar information. Once the similar networks are identified, communication settings service 150 may identify communication rules that apply to the new computing network. Thus, if a similar computing network employed a rule for an application represented in computing network 110 as application group 130, then computing network 110 may be provided with the same rule. Although rules for the same application may be provided, it should be understood that communication settings service 150 may also provide rules for applications that are similar to those executing in computing network 110. For instance, communication settings service 150 may identify rules that are associated with a slightly different version of an application to be provided to the computing network 110. Similarly, applications with different licenses and compliance guidelines to the applications from the requesting computing network may also be considered in selecting rules that are provided for the requesting network.

In some examples, in selecting the communication rules to be provided to computing network 110, communication settings service 150 may identify rules that are frequently applied for particular applications. For example, if an application is deployed in multiple networks, then rules that are applied in a threshold number of the networks may be provided to computing network 110. This threshold may be a total number of networks, a proportion of the overall networks, or some other quantifier for the deployment of the communication rule.

In providing the rules to the computing environment, in some implementations, communication settings service 150 may initiate the deployment of the communication rules within the environment, wherein the deployment configures the virtual switches of the environment to process ingress and egress packets from virtual nodes as prescribed by the rules. In other implementations, the subset of the communication rules may be provided to management system 160 and accessible to an administrator of computing network 110. Once provided, the administrator of the environment may select one or more of the recommended rules, wherein the rules may be implemented upon selection.

In some examples, when the rules are provided to the administrator via management system 160, the rules may be prioritized based on deployment information for the rules within computing networks 111. In prioritizing the suggested actions for the administrator, communication settings service 150 may identify priority based on the number of computing networks that the rule was implemented, the similarity of networks to computing network 110, or some other similar mechanism of prioritization. These prioritized recommended communication rules may be provided as a list, wherein rules with a higher priority are promoted over other rules, may be provided with highlighted or otherwise emphasized rules with a higher priority over other rules, or may be provided to the administrator in any other manner. Once provided, the administrator may select communication rules from the available communication rules. Further, in some examples, in addition to the suggested rules capable of implementation, the administrator may also generate their own rules, wherein the administrator may define sources, destinations, and actions for each of the communication rules.

Once the communication rules are implemented within computing network 110, information about the rules may be provided back to communication settings service 150. Once received, communication settings service 150 may use the rules in conjunction with the rules from computing networks 111 to provide suggested communication rules to new or requesting computing networks.

In at least one example, rather than providing rules to a new computing network, it should be understood that communication settings service 150 may provide rule suggestions at any point during the operation of a network. For example, if multiple computing networks implemented a communication rule for two applications, communication settings service 150 may be used to provide or suggest the communication rule to other computing networks. In this manner, as new rules are generated at other networks, the rules may be suggested and implemented in other networks that execute similar applications.

Figure 4:
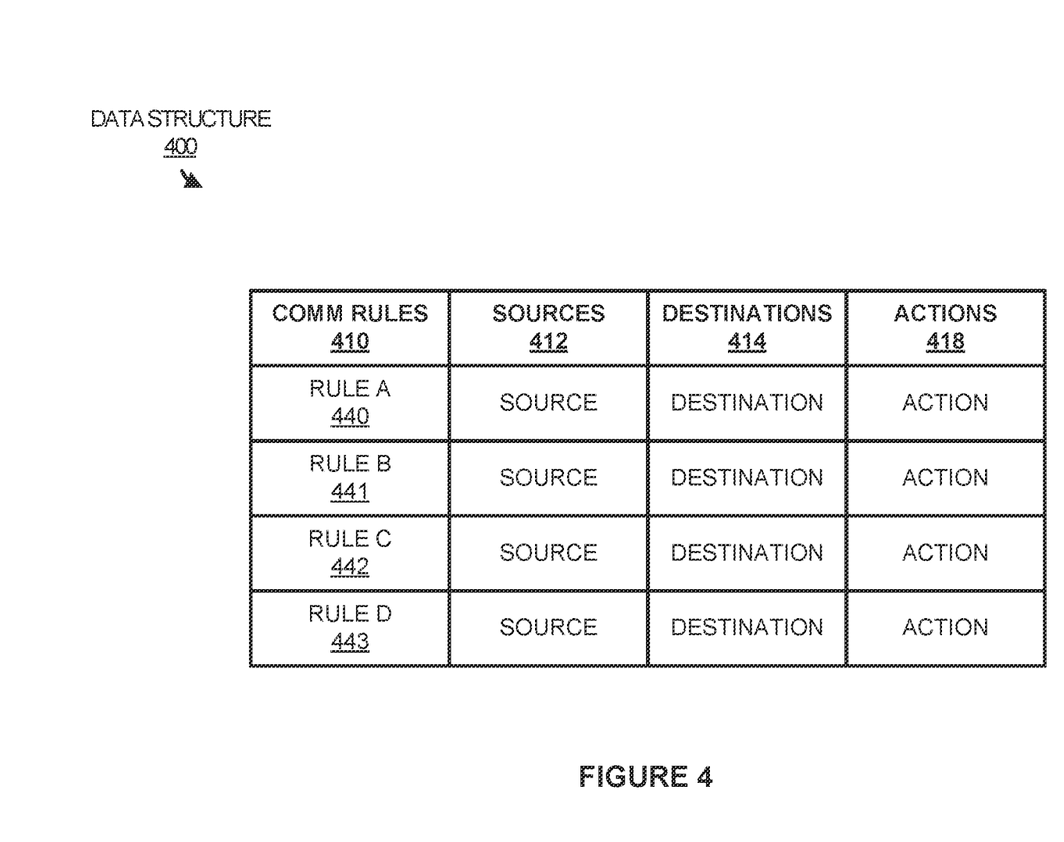
FIG. 4 illustrates a data structure to manage communication rules according to an implementation.

FIG. 4 illustrates a data structure 400 to manage communication rules according to an implementation. Data structure 400 is an example data structure that may be maintained by communication settings service 150 and may further be maintained locally at a management system for a computing network. Data structure 400 includes columns for communication (comm) rules 410, sources 412, destinations 414, and actions 418. In some implementations, although not illustrated in data structure 400 it should be understood that additional information may be maintained for each of the rules, such as protocol information, port information, or some other similar information about the communications.

As described herein, administrators of computing networks may generate communication rules that define what virtual nodes may communicate with within the network and outside of the network. In defining the rules, each of the rules includes a source, a destination, and an action (or forwarding action). The source for the communications may comprise an application type for the virtual nodes (e.g. a front-end service, a productivity application, and the like) or may define computing systems and/or nodes outside of the computing network. For example, a communication rule may define a source as a productivity application or may define the source as "ANY" which would allow any application within the network to be a source. Similar to the source, the destination in destinations 414 may define an application type for the virtual nodes (e.g. a front-end service, a productivity application, and the like) or may define computing systems and/or nodes outside of the computing network. As an example, a destination may comprise an image editing application or a serving computing system remote to the computing network.

In addition to the sources and destinations, data structure 400 further includes actions 418, which defines how a packet should be processed when it includes both the source and the destination. These actions may include actions to block, permit, modify, or perform other similar actions on the identified packet. For example, rule A 440 may define a source in sources 412 as a programming application, and a destination in destinations 414 as a database application. When traits are identified within a packet that correspond to the applications (e.g. IP addresses associated with virtual nodes that correspond to a programming application and a database application), then the corresponding action may be taken on the packet.

In some implementations, when a rule is deployed within a computing network, flow tables or data structures are updated within the virtual switches of the host machines to provide the required forwarding policies. In particular, because the rules may define groups of computing nodes (such as application groups), individual nodes are identified that correspond to the groups. Once the individual nodes are identified, attributes are used in updating the flow tables and data structures. Returning to the example of the programming application communicating with the database application, virtual nodes may be identified that correspond to each of the groups. Once the nodes are identified, traits, such as IP addresses associated with the nodes, may be used by the virtual switches in identifying and forwarding packets based on the action for the rule.

Figure 5:
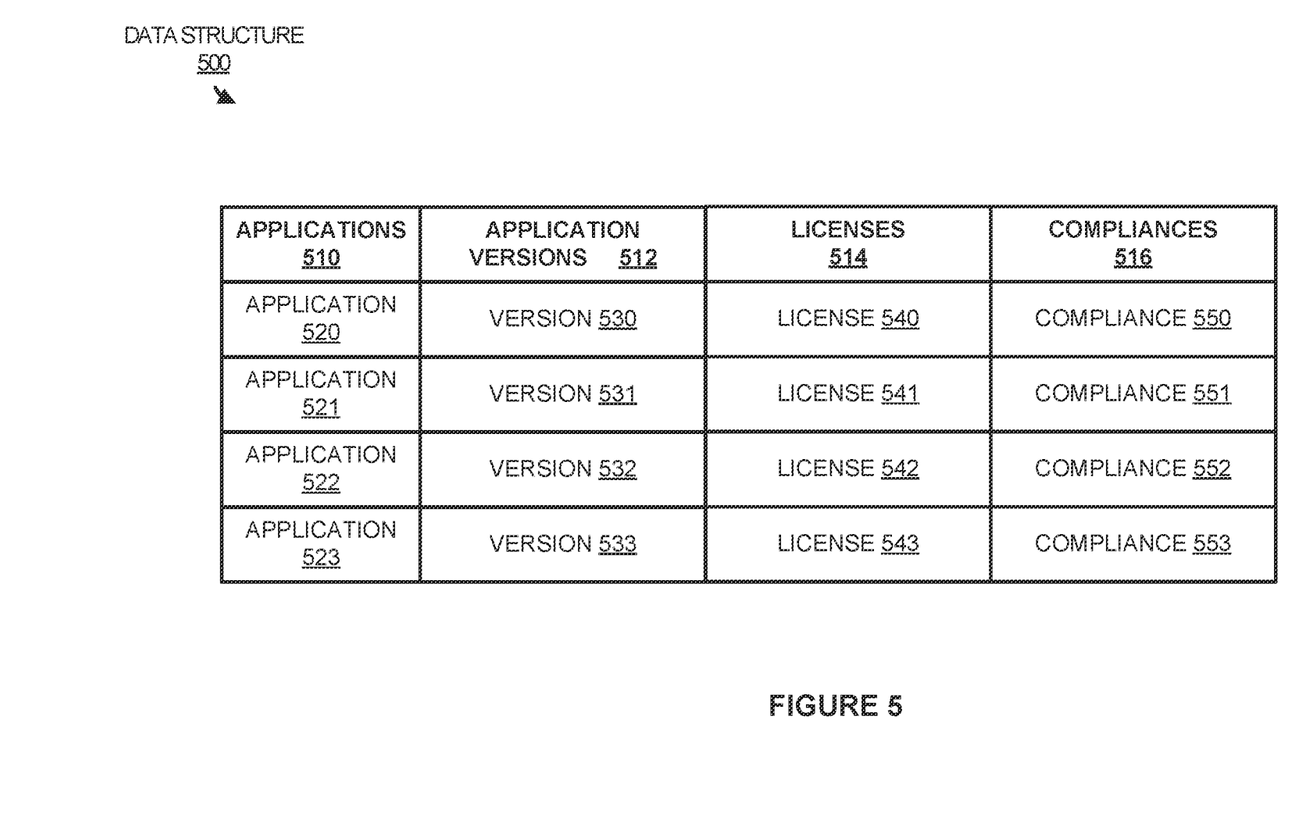
FIG. 5 illustrates a data structure to maintain application information according to an implementation.

FIG. 5 illustrates a data structure 500 to maintain application information according to an implementation. Data structure 500 includes columns for applications 510, application versions 512, licenses 514, and compliances 516. Applications 510 include application 520-523, application versions 512 include version 530-533, licenses 514 include licenses 540-543, and compliances 516 include compliances 550-553. Although demonstrated in the present example with four columns, it should be understood that additional or fewer columns may be used to identify traits of applications.

As described herein, as computing networks are developed, administrators of the computing networks may desire to obtain communication rule suggestions from other similar computing networks. For example, if an administrator were developing a new computing network environment with a front-end, a data processing application, and a database, then the administrator may seek to identify communication rules that were used in other similar networks. To identify suggested rules for an environment, data structure 500 may be generated and supplied to a communication settings service that is shared between multiple computing networks. Based on the information within the data structure, the communication settings service may identify suggested rules for the new environment and provide the identified rules to the requesting network. In some examples, the information within data structure 500 may be provided by an administrator of the computing network, however, it should be understood that in addition to or in place of the information from the administrator, the management system of the computing network may identify traits of applications within the environment.

In the present implementation, the information within data structure 500 includes a name for the application and supplementary information for the application. For example, application 520 corresponds to version 530, license 540, and compliance 550. Compliance 550 may define health or finance compliances that must be maintained for the security of the application. As a result, rules for applications that require the same compliances may be favored over other rules that do not require the same compliances.

In some implementations, when the application information of data structure 500 is provided to the communication settings service, the settings service may identify computing networks with a similar structure to that of the requesting network that meet a similarity criteria. This similar structure may include the types of applications within the environment, the number of applications or nodes within the network, the types of compliance for the applications, or any other similar information. Once the similar networks are identified based on the criteria, communication rules may be identified that apply to the requesting computing network. For example, if a rule in a previous network permitted a first type of application to communicate with a second type of application, then the rule may be provided to the requesting computing network to implement the rule for the first and second type of application.

In some examples, in providing the rules to the requesting computing network, the rules may be provided to a management system for the network, wherein an administrator can select rules that are applicable. In providing the rules, the communication settings service may be used to promote or prioritize the communication rules that are provided to the administrator. This promoting or rating of the rules may be based on a variety of factors, including the similarity in network between the source network for the rule and the requesting network for the rule, the quantity of networks that implement the rule, the compliance characteristics of the rules in relation to the requesting network, or any other similar trait. To promote the rules the rules may be provided as a hierarchical list, may be provided with one or more rules highlighted or emphasized over other rules, or may be provided in any other similar manner.

In other examples, in addition to or in place of providing the administrator with a set of rules for selection, the communication settings service may initiate the implementation of one or more rules within the computing network. In initiating the implementation of the rule, the communication settings service may provide the rule to the management system for the computing network, wherein the management system may distribute the rule to the virtual switches deploying the software defined networks. Once provided to the virtual switches, the virtual switches may update flow tables or other similar data structures to identify traits within the packets, and provide the desired forwarding action on the packets.

Figure 6:
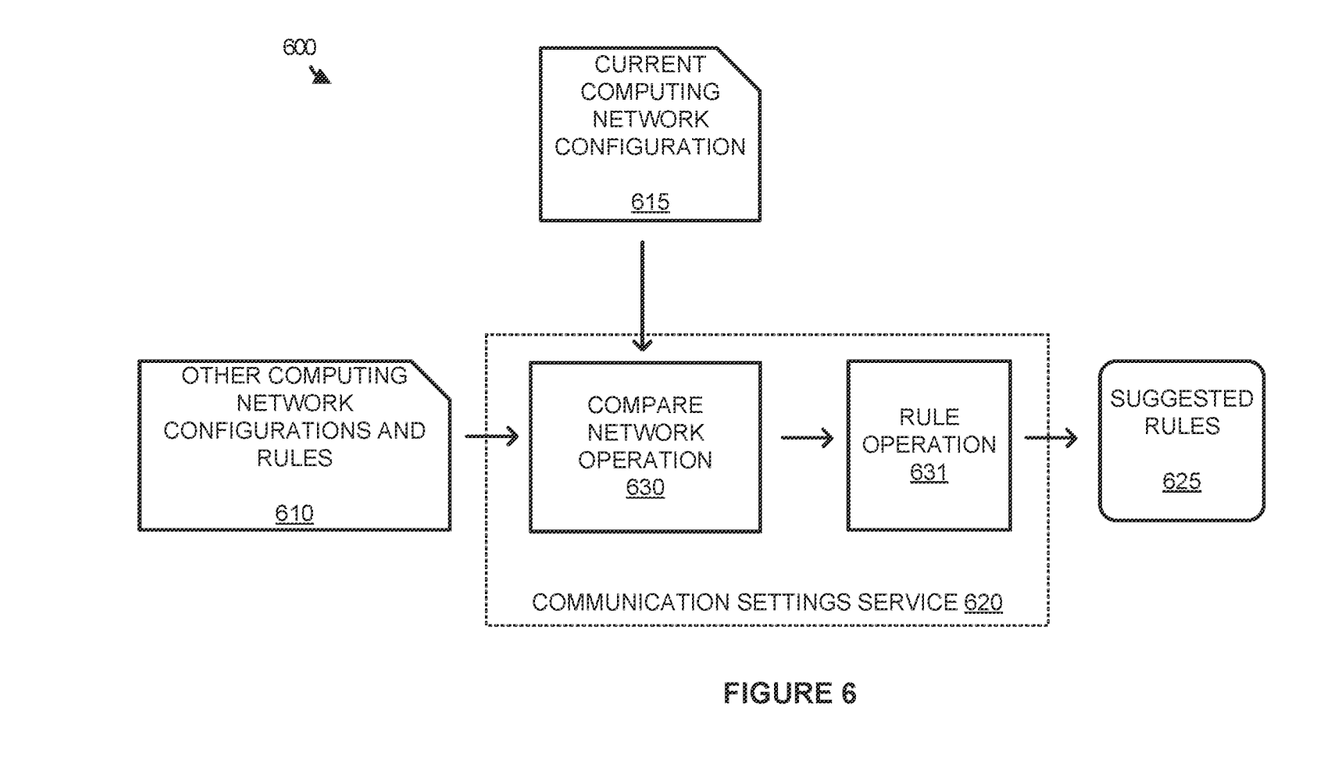
FIG. 6 illustrates a flow diagram for providing communication rules according to an implementation.

FIG. 6 illustrates a flow diagram 600 for providing communication rules according to an implementation. Flow diagram 600 includes compare network operation 630 and rule operation 631 that are provided by a communication settings service 620.

In operation, communication settings service 620 obtains a current computing network configuration 615 for a computing network, and other computing network configurations and rules 610 from one or more other computing networks. These computing networks each include a plurality of virtual nodes that execute a plurality of applications. For example, a computing network may employ front-end applications, data processing applications, and database applications, and may further implement communication rules to support secure communications for the applications. These communication rules are used to update virtual switches that provide network connectivity for the virtual nodes, wherein the communication rules define sources, destinations, and forwarding actions to be taken on identified packets. In some implementations, communication settings service 620 may maintain information about the configurations and rules for the other computing networks, such that when a computing network provides a new configuration, the maintained information may be used in providing suggested communication rules to the computing network.

In the example of flow diagram 600, when a request from a computing network is obtained with current computing network configuration 615, compare network operation 630 is used to identify computing networks that meet similarity criteria. This comparing operation may consider the application types that are similar, the quantity of similar applications, the size of the computing networks, or any other similar information to determine whether another network meets the similarity criteria. For example, the requesting computing network and one or more other computing networks may share a plurality of applications. These shared applications may have the same name or title, the same or similar version, the same or similar credentials, the same or similar licenses, or some other similarities.

Once the similar networks are identified, rule operation 631 is provided to identify suggested rules 625 to be provided to the requesting network. In some implementations, rules may be provided that correspond to identically shared or substantially similar applications. Substantially shared applications may include applications with a similar version identifier, a similar license, a similar compliance, or some other similarity, including combinations thereof. Further, applications that provide the same operation (e.g. text editing) may also be classified as substantially similar in some implementations. After the rules are identified for the applications, the communication rules are provided to the requesting computing network for implementation. This implementation may be automatic without interaction from the administrator of the computing network, or may require input from the administrator to select the desired communication rules.

In some implementations, in addition to selecting the rules to be provided to a computing network and a management system operating therein, rule operation 631 may further be configured to score and/or prioritize the rules that are provided to the administrator of the network. This prioritizing of the communication rules may be based on a variety of factors, including the similarity between the application or applications in the requesting computing network and the application or applications on the other computing networks, the size of the requesting computing network in relation to the other computing networks, the security constraint similarities between the networks, the quantity of networks that implemented the same rule, or some other prioritization factor. Once prioritized, the communication rules may be provided to the administrator and presented in a manner to express the prioritization.

Figure 7:
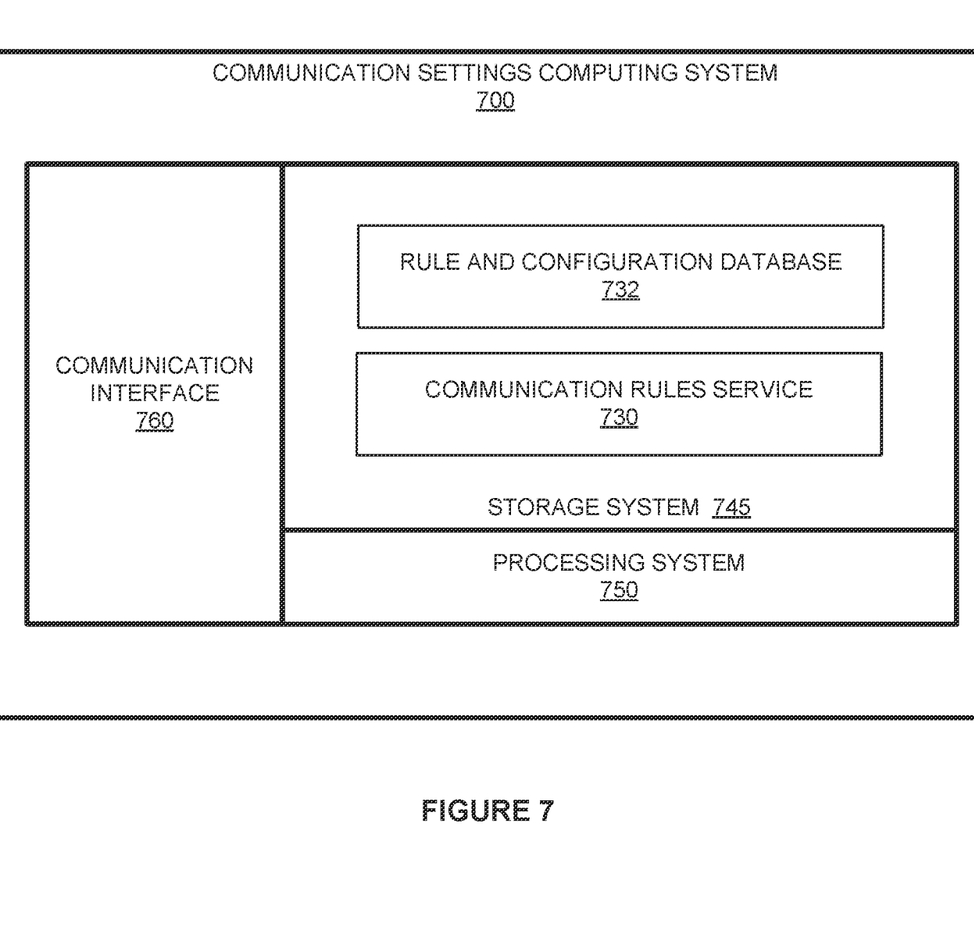
FIG. 7 illustrates a communication settings computing system to provide suggested communication rules according to an implementation.

FIG. 7 illustrates a communication settings computing system 700 to provide suggested communication rules according to an implementation. Computing system 700 is representative of any computing system or systems with which the various operational architectures, processes, scenarios, and sequences disclosed herein for a communication settings system can be implemented. Computing system 700 is an example of communication settings service 150 of FIG. 1, although other examples may exist. Computing system 700 includes storage system 745, processing system 750, and communication interface 760. Processing system 750 is operatively linked to communication interface 760 and storage system 745. Communication interface 760 may be communicatively linked to storage system 745 in some implementations. Computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 is configured to communicate with one or more management systems of computing networks as described herein to maintain information about implemented communication rules, and provide suggested communication rules.

Processing system 750 comprises microprocessor and other circuitry that retrieves and executes operating software from storage system 745. Storage system 745 may include volatile and nonvolatile, removable and non-removable media implemented in any method or technology for storage of information, such as computer readable instructions, data structures, program modules, or other data. Storage system 745 may be implemented as a single storage device, but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 comprises communication rules service 730 capable of providing at least operation 200 of FIG. 2, and rule and configuration database 732. The operating software on storage system 745 may further include an operating system, utilities, drivers, network interfaces, applications, or some other type of software. When read and executed by processing system 750 the operating software on storage system 745 directs computing system 700 to operate as described herein.

In at least one implementation, communication rules service 730 directs processing system 750 to maintain communication rules for a plurality of computing networks using rule and configuration database 732. In maintaining the communication rules, as computing networks implement communication rules, the computing networks may provide information about their communication rules to communication settings computing system 700. This information may include information about the applications within the networks (name, version, license, compliance, and the like) and may further provide information about the communication rules implemented for each of the applications. These communication rules provide a source, wherein the source may comprise an application group or groups within the network or one or more computing nodes outside of the computing network, a destination, wherein the destination may comprise an application group or groups within the computing network or one or more computing nodes outside of the computing network, and an action which is to be implemented when the source and destination are identified. As an example, a communication rule may permit a front-end application that operates on one or more virtual nodes to communicate with a data processing application that also operates on one or more virtual nodes.

As the information is maintained communication rules service may receive a request for communication rules for a new or existing computing network, wherein the request will provide information about the applications executing within the environment. In response to the request, communication rules service will identify communication rules to be provided to the requesting network based on the application information supplied. In some implementations, the providing of the application rules may include initiating implementation of the rules, however, it should be understood that the rules may be provided to an administrator of the network for implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   identifying a configuration request for a computing network, wherein the configuration request indicates information about a plurality of applications executing in the computing network;
   in response to the configuration request, identifying a subset of computing networks from a plurality of computing networks that meet similarity criteria to the computing network based on the information about the plurality of applications; and
   identifying communication rules for the computing network from the subset of computing networks, wherein the communication rules define forwarding actions for ingress and egress packets to and from virtual nodes in the subset of computing networks based on information about applications on the virtual nodes.

2. The method of claim 1, wherein identifying the configuration request from the computing network comprises receiving the configuration request from a management system associated with the computing network.

3. The method of claim 1, wherein the virtual nodes comprise virtual machines and/or containers.

4. The method of claim 1, wherein each of the communication rules define a source, a destination, and a forwarding action.

5. The method of claim 4, wherein at least one of the source or the destination comprises at least one application group.

6. The method of claim 1, further comprising providing the communication rules to the computing network.

7. The method of claim 6, wherein providing the subset of the communication rules to the computing network comprises initiating an implementation of the communication rules in the computing network.

8. The method of claim 6, wherein providing the subset of the communication rules to the computing network comprises transferring the communication rules to a management system of the computing system for selection by an administrator of the computing network.

9. The method of claim 1, wherein the similarity criteria comprise application types and network size.

10. A computing apparatus comprising:
    one or more non-transitory computer readable storage media;
    a processing system operatively coupled to the one or more non-transitory computer readable media; and
    program instructions stored on the one or more non-transitory computer readable storage media that, when read and executed by the processing system, direct the computing apparatus to:
    identify a configuration request for a computing network, wherein the configuration request indicates information about a plurality of applications executing in the computing network;
    in response to the configuration request, identify a subset of computing networks from a plurality of computing networks that meet similarity criteria to the computing network based on the information about the plurality of applications; and
    identify communication rules for the computing network from the subset of computing networks, wherein the communication rules define forwarding actions for ingress and egress packets to and from virtual nodes in the subset of computing networks based on information about applications on the virtual nodes.

11. The computing apparatus of claim 10, wherein identifying the configuration request from the computing network comprises receiving the configuration request from a management system associated with the computing network.

12. The computing apparatus of claim 10, wherein the virtual nodes comprise virtual machines and/or containers.

13. The computing apparatus of claim 10, wherein each of the communication rules define a source, a destination, and a forwarding action.

14. The computing apparatus of claim 13, wherein at least one of the source or the destination comprises at least one application group.

15. The computing apparatus of claim 10, wherein the program instructions further direct the computing apparatus to provide the communication rules to the computing network.

16. The computing apparatus of claim 15, wherein providing the subset of the communication rules to the computing network comprises initiating an implementation of the communication rules in the computing network.

17. The computing apparatus of claim 15, wherein providing the subset of the communication rules to the computing network comprises transferring the communication rules to a management system of the computing system for selection by an administrator of the computing network.

18. The computing apparatus of claim 10, wherein the similarity criteria comprise application types and network size.

19. An apparatus comprising:
one or more non-transitory computer readable storage media; and
program instructions stored on the one or more non-transitory computer readable storage media that, when executed by at least one processor, direct the at least one processor to:

identify a configuration request for a computing network, wherein the configuration request indicates information about a plurality of applications executing in the computing network;

in response to the configuration request, identify a subset of computing networks from a plurality of computing networks that meet similarity criteria to the computing network based on the information about the plurality of applications, wherein wherein the similarity criteria comprise application types and network size; and identify communication rules for the computing network from the subset of computing networks, wherein the communication rules define forwarding actions for ingress and egress packets to and from virtual nodes in the subset of computing networks based on information about applications on the virtual nodes.

20. The apparatus of claim 19, wherein the program instructions further direct the at least one processor to initiate an implementation of the communication rules in the computing network.

* * * * *